June 27, 1967     A. F. HOGLUND ET AL     3,328,048

ISOLATED STUB FRAME FOR AUTOMOTIVE VEHICLES

Filed June 24, 1965

INVENTORS.
FRANK T. JASKOWIAK
ADOLPH F. HOGLUND
JOHN J. DUERO
BY HOWARD J. BARNETT

Attorney

United States Patent Office 3,328,048
Patented June 27, 1967

3,328,048
ISOLATED STUB FRAME FOR AUTOMOTIVE VEHICLES
Adolph F. Hoglund, Frank T. Jaskowiak, and John J. Duero, Milwaukee, Wis., assignors to A. O. Smith Corporation, Milwaukee, Wis., a corporation of New York
Filed June 24, 1965, Ser. No. 466,603
4 Claims. (Cl. 280—106)

This invention is directed to an isolated stub frame for an automotive vehicle, and more particularly to a chassis frame for the wheel suspension, engine, and transmission. The stub frame is connected to the vehicle body and sheet metal through a plurality of resilient connecting means to isolate substantially all undesired road and engine vibrations from the passenger compartment of the vehicle.

The automotive industry has recently emphasized the advantages of a rear engine vehicle, and popular demand for this type of vehicle has increased substantially over the last six years.

However, there are several significant drawbacks with the rear engine vehicles presently available. Not the least of these is the high level of noise, vibration and harshness usually associated with the unitized construction presently being used. Also, loads are higher on the rear end of this type of vehicle since it not only supports the engine and transmission mass, but also supports the rear wheels which propel the vehicle over the ground.

This invention solves the above problems and, in addition, provides a convenient sub-assembly to facilitate the vehicle assembly during manufacture. The stub frame of the invention is completely isolated from the passenger compartment of the vehicle by resilient attachment means. The stub frame itself is designed to provide maximum strength to the rear portion of the vehicle without adding excessive weight.

The drawings illustrate the presently preferred method of carrying out the invention.

Figure 1:
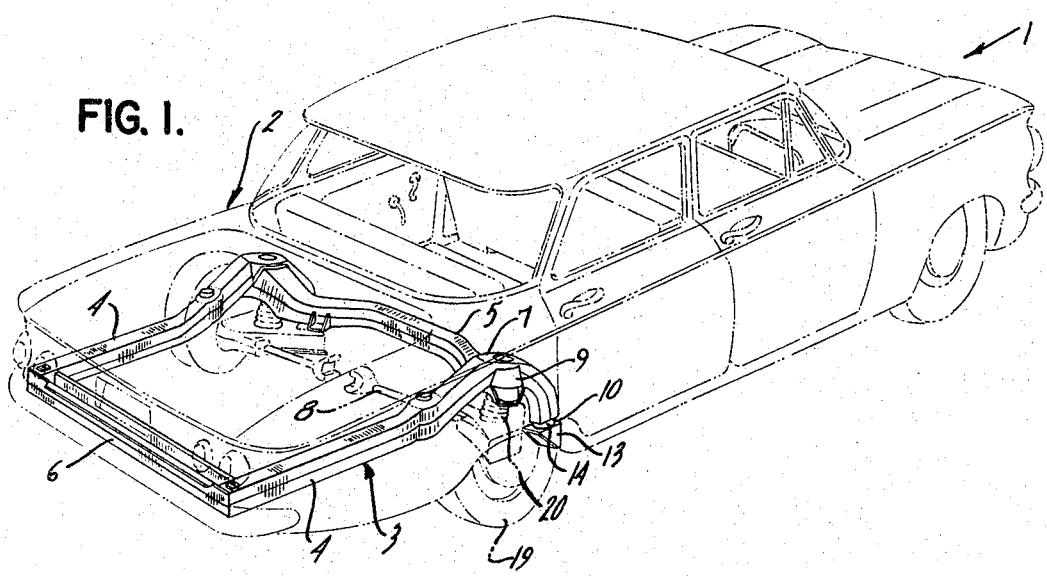
FIGURE 1 is a perspective of the stub frame of the invention with the vehicle shown in phantom.
Figure 2:
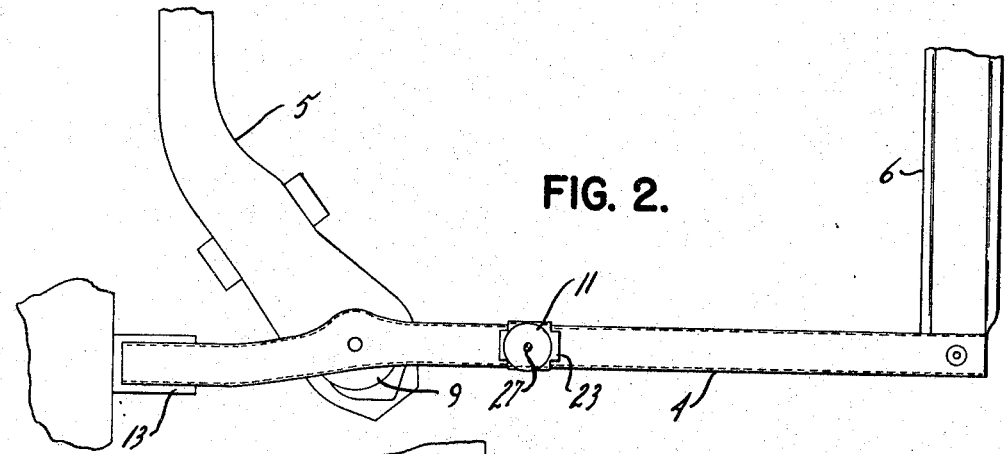
FIG. 2 is a top plan view of the left half of the stub frame.

As shown in the drawings, a vehicle body 1 includes a rear portion 2 which is disposed over a rear stub frame 3. The rear stub frame 3 includes a pair of side rails 4, a large front cross bar 5 and a rear cross bar 6.

The front portion of the side rails 4 include a high kickup portion 7 which provides clearance for the rear swing axles 8, shown in phantom in FIG. 1. The front cross bar is disposed at the highest part of the kickup portion 7 and includes coil spring seats 9 at the outer ends at the portions underlying the respective side rails 4.

The stub frame 3 is attached to the body 2 at a plurality of body-to-frame attachment assemblies 10, 11 and 12 disposed along the respective side rails 4.

Figure 3:
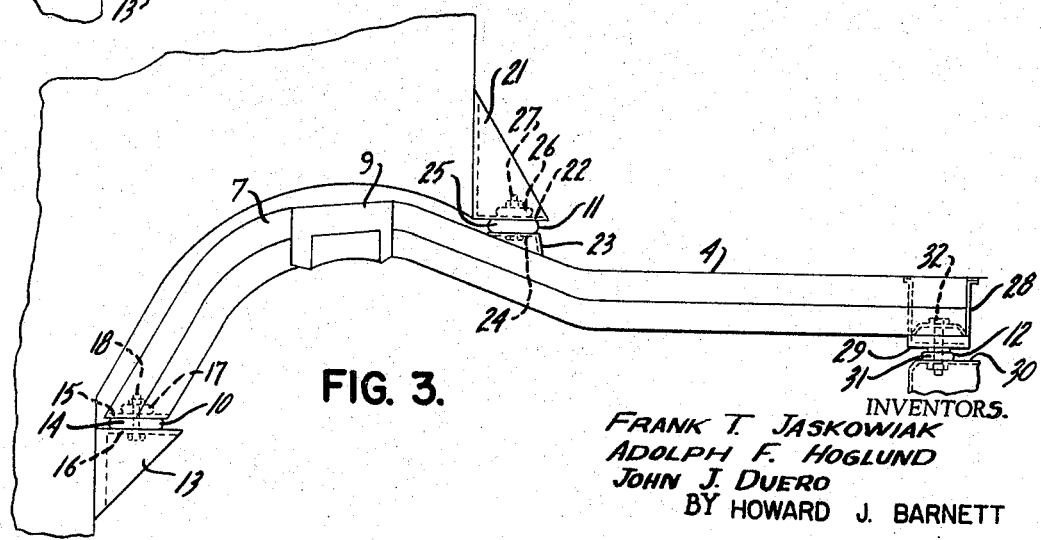
FIG. 3 is a side view of the stub frame showing the attachments to the vehicle body.

The attachment assembly 10 includes a platform bracket 13, which is welded to the vehicle body 1, as best seen in FIG. 3. An annular rubber compression pad 14 is disposed between an end plate 15 of side rail 4 and a horizontal platform 16 of the bracket 13 to provide a resilient connection therebetween. A second, smaller annular rubber pad 17 is disposed above the end plate 15 of side rail 4, and the assembly 10 is held together by means of a bolt assembly 18. Road impact forces are applied to attachment assembly 10 through wheels 19, springs 20, spring seats 9 and side rails 4 and these road impact forces tend to compress the annular compression pad 14, which is opposite to the usual body-to-frame attachment assembly function. The upper pad 16 serves as the normal load bearing element.

The vehicle body 1 extends rearwardly over the stub frame 3, and over the spring seats 9 to the rear of the kick-up portion 7. A large, inverted platform bracket 21 is connected to the body 1, and includes a bottom horizontal platform 22 which provides a body surface contact for the attachment assembly 11. The frame side rail 4 has a complementary bracket 23 with a horizontal surface 24. An annular load pad 25 is disposed between the horizontal platform 22 and the plate surface 24 to provide a second resilient connection between the frame 3 and the body 1. A second annular pad 26 is disposed above the platform 22 and the complete assembly is secured together by means of a bolt assembly 27. The attachment assembly 11 receives load forces in the normal manner because the body 1 is disposed above and is supported on the stub frame 3 at this area.

The third attachment assembly 12 is disposed at the rear end of the rear portion 2 of the vehicle body 1. The side rail 4 includes an attachment bracket 28 at the rear end. The bracket 28 has a bottom, horizontal surface 29 which opposes a complementary horizontal surface 30 of the rear portion 2 of the vehicle body 1. A compressible annular pad 31 is disposed between the surfaces 29 and 30. The attachment assembly 12 is held together by a bolt assembly 32. Assembly 12 is similar to assembly 10 in operation because road impacts cause the frame side rail 4 to transmit load forces downwardly through the compressible annular pad 31 to the rear portion 2 of the body 1.

The attachments 10, 11 and 12 provide complete vibration damping isolation between the vehicle body 1 and the stub frame 3. All rear wheel impacts and motor vibrations are substantially completely damped and isolated from the passenger compartment of the vehicle because there is no direct metal-to-metal connection between the stub frame 3 and the vehicle body 1.

It is contemplated that the stub frame isolation system of the invention could also be applied to a front engine vehicle with similar success. Some adaptation is necessary, of course, to accommodate the front control arm type of suspension and the steering assembly, but such minor changes are believed to be obvious and clearly shown in the patent art.

The invention provides a novel construction for a passenger vehicle which incorporates a completely isolated stub frame of high stability, but which provides a substantially improved riding semi-utilized vehicle.

What is claimed is:

1. In a vehicle having a body portion and a frame end element, attachment assemblies connecting said frame end element to said body portion with no metal-to-metal contact between said frame end element and said body portion, an integral, load supporting extension of the body portion extending around and under the frame end element, and at least one attachment assembly disposed on the underside of said frame end element and above the said extension of the body portion, said attachment means being of a vibration isolating type and connecting said extension to the frame end element with no metal-to-metal contact.

2. The apparatus of claim 1, in which the extension of the body portion is disposed at the outer end of said body portion and extends under the outer end of said frame end element, and having an attachment assembly disposed below the outer end of said frame end element and above said extension at the outer end of said body portion to provide equalized loading of said frame end element thereby increasing the stability of the end portion of said vehicle.

3. The apparatus of claim 1, in which the extension of said body portion extends under said frame end element at the inner end thereof, and including an attachment assembly disposed above said extension and below said frame end element to provide a stable connection therebetween.

4. An isolated stub frame in an automotive vehicle including a body having a middle portion and two end portions, said stub frame comprising, a pair of parallel side rails, a large inner cross bar adjacent the middle body portion of said vehicle, an outer cross bar, said side rails and cross bars being joined together at their adjacent ends to define a generally rectangular frame support means for an end body portion of said vehicle, a first pair of attachment assemblies disposed between the inner ends of said side rails and said middle body portion of said vehicle under said frame, a second pair of attachment assemblies disposed on said side rails intermediate the ends thereof and connecting the intermediate part of the end body portion of said vehicle to said frame, and a third pair of attachment assemblies disposed at the outer ends of said stub frame under said side rails and connecting the outer end portion of said vehicle body to said frame, said attachment assemblies including means to completely isolate said body from said stub frame, whereby complete vibration damping of all road impacts and stub frame vibrations is accomplished in said attachment assemblies.

References Cited
UNITED STATES PATENTS 2,817,557  12/1957  Reynolds.
3,149,856  9/1964  Schilberg _____ 280—106

BENJAMIN HERSH, *Primary Examiner.*

PHILLIP GOODMAN, *Assistant Examiner.*